(12) United States Patent
Kobayashi

(10) Patent No.: US 11,500,213 B2
(45) Date of Patent: Nov. 15, 2022

(54) HEAD-MOUNTED DISPLAY CAPABLE OF PREVENTING DAMAGE OF AN IMAGE DISPLAY APPARATUS

(71) Applicant: SONY CORPORATION, Tokyo (JP)

(72) Inventor: Toshimi Kobayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 246 days.

(21) Appl. No.: 16/758,041

(22) PCT Filed: Jul. 26, 2018

(86) PCT No.: PCT/JP2018/028111
§ 371 (c)(1),
(2) Date: Apr. 21, 2020

(87) PCT Pub. No.: WO2019/087483
PCT Pub. Date: May 9, 2019

(65) Prior Publication Data
US 2020/0319468 A1    Oct. 8, 2020

(30) Foreign Application Priority Data

Oct. 30, 2017   (JP) .............................. JP2017-208936

(51) Int. Cl.
*G02B 27/01*         (2006.01)
(52) U.S. Cl.
CPC ..... *G02B 27/0176* (2013.01); *G02B 27/0172* (2013.01); *G02B 2027/0154* (2013.01); *G02B 2027/0178* (2013.01)
(58) Field of Classification Search
CPC ............ G02B 27/0176; G02B 27/0172; G02B 2027/0178; G02B 2027/0154
See application file for complete search history.

(56) References Cited

U.S. PATENT DOCUMENTS 9,557,567 B2 *   1/2017  Hiraide .............. B32B 37/1284
9,746,674 B2 *   8/2017  Hiraide .............. G02B 27/0172
(Continued)

FOREIGN PATENT DOCUMENTS

CN          102213830 A      10/2011
CN          103995353 A       8/2014
(Continued)

OTHER PUBLICATIONS

International Search Report and Written Opinion of PCT Application No. PCT/JP2018/028111, dated Oct. 23, 2018, 08 pages of ISRWO.

*Primary Examiner* — Bao-Luan Q Le
(74) *Attorney, Agent, or Firm* — Chip Law Group

(57) ABSTRACT

[Problem] Proposed is a head-mounted display capable of preventing deformation or damage of an image display apparatus due to concentration of an external force on a part of the image display apparatus. [Solution] A head-mounted display includes a frame that is worn on a head of an observer, an image display apparatus that is connected to a central part of the frame in a left-right direction and that includes an image forming apparatus and an optical member that is connected to the image forming apparatus and arranged in front of left and right eyes of the observer, and a rotation restricting unit that is arranged opposite to, across a predetermined gap in a front-rear direction, one of the optical member and an extended part extending from the optical member.

14 Claims, 9 Drawing Sheets

(56) References Cited

U.S. PATENT DOCUMENTS

| | | | |
|---|---|---|---|
| 2008/0186445 A1* | 8/2008 | Van Atta | G02C 1/04 351/103 |
| 2009/0257019 A1* | 10/2009 | DiChiara | G02C 1/10 351/159.01 |
| 2009/0268287 A1* | 10/2009 | Buchon | G02B 7/1805 359/480 |
| 2011/0241975 A1 | 10/2011 | Mukawa et al. | |
| 2012/0200477 A1* | 8/2012 | Fujishiro | G02B 27/0176 345/8 |
| 2012/0200787 A1* | 8/2012 | Fujishiro | G02B 27/0176 349/5 |
| 2012/0200934 A1* | 8/2012 | Fujishiro | G02B 30/34 359/630 |
| 2012/0200935 A1* | 8/2012 | Miyao | G02B 27/0172 359/630 |
| 2012/0200936 A1* | 8/2012 | Takagi | G02B 27/0172 359/630 |
| 2014/0139927 A1* | 5/2014 | Hiraide | G02B 27/0176 359/630 |
| 2014/0232619 A1* | 8/2014 | Hiraide | G02B 27/0176 345/8 |
| 2014/0307315 A1* | 10/2014 | Bohn | G02B 27/0176 359/480 |
| 2014/0327602 A1* | 11/2014 | Hiraide | G02B 27/0172 345/8 |
| 2014/0327603 A1* | 11/2014 | Hiraide | G02B 27/0172 345/8 |
| 2014/0340285 A1* | 11/2014 | Hiraide | G02B 27/0172 345/8 |
| 2015/0185477 A1* | 7/2015 | Hiraide | G02B 27/0172 345/8 |
| 2015/0185481 A1* | 7/2015 | Hiraide | G02B 6/0053 359/630 |
| 2018/0052327 A1* | 2/2018 | Kamakura | G02B 27/0172 |

FOREIGN PATENT DOCUMENTS

| | | |
|---|---|---|
| EP | 2378346 A1 | 10/2011 |
| JP | 2005-521099 A | 7/2005 |
| JP | 4674634 B2 | 4/2011 |
| JP | 2011-221129 A | 11/2011 |
| JP | 4858512 B2 | 1/2012 |
| JP | 2014-160112 A | 9/2014 |
| JP | 5678460 B2 | 3/2015 |

\* cited by examiner

HEAD-MOUNTED DISPLAY CAPABLE OF PREVENTING DAMAGE OF AN IMAGE DISPLAY APPARATUS

CROSS REFERENCE TO RELATED APPLICATIONS

This application is a U.S. National Phase of International Patent Application No. PCT/JP2018/028111 filed on Jul. 26, 2018, which claims priority benefit of Japanese Patent Application No. JP 2017-208936 filed in the Japan Patent Office on Oct. 30, 2017. Each of the above-referenced applications is hereby incorporated herein by reference in its entirety.

FIELD

The present disclosure relates to a head-mounted display.

BACKGROUND

In recent years, a head-mounted display that is used by being worn on a head of an observer (user) has been known. The head-mounted display causes a virtual-image optical system to display, as an enlarged virtual image, a two-dimensional image formed by an image forming apparatus and causes the observer to observe the image, for example.

Patent Literatures 1 and 2 disclose a structure in which, in a binocular vision head-mounted display, light guide plates of two left and right optical modules are joined together by a joint member, and the joint member is mounted on a central part that is located between left and right eyes of an observer on a front part of a frame. Further, Patent Literature 3 discloses a structure in which, in a binocular vision head-mounted display, an image display apparatus in which light guide plates of two left and right optical modules are connected by a connection plate is mounted on a central part that is located between left and right eyes of an observer on a front part of a frame.

In the structures disclosed in Patent Literatures 1 to 3, even if the frame is deflected because a temple part is stretched outward when a user wears the frame on the head, it is possible to prevent deformation of the optical modules. Therefore, it is possible to reduce variation between left and right convergence angles.

CITATION LIST

Patent Literature

Patent Literature 1: Japanese Patent No. 4674634
Patent Literature 2: Japanese Patent No. 4858512
Patent Literature 3: Japanese Patent No. 5678460

SUMMARY

Technical Problem

However, in the head-mounted displays described in Patent Literatures 1 and 2, if an external force is directly applied to the image display apparatus, the convergence angles may vary due to deformation of the light guide plates. Further, if the external force directly applied to the image display apparatus excessively increases, the light guide plates may be damaged. For example, if the frame is stuck when the user removes the head-mounted display from the head while holding the left and right optical modules, only the optical modules move, and a rotation force about a connection position of the joint member when viewed from above the head acts on the light guide plates. Due to this force, the light guide plates may be deformed and the convergence angles may vary or the light guide plates may be damaged.

To prevent deformation and damage of the light guide plates as described above and to secure the convergence angles, it may be possible to process a highly-rigid member, such as magnesium die cast or aluminum die cast, with high accuracy, and support peripheries of the light guide plates like a rim of eyeglasses, for example. However, if the peripheries of the light guide plates are supported by the highly-rigid member as described above, the member may appear in a visual field and visibility may be reduced.

Further, in the head-mounted display described in Patent Literature 3, the light guide plates of the two left and right optical modules are connected using the connection plate, so that reduction of the visibility is reduced. However, in the head-mounted display described in Patent Literature 3, there is still the possibility that the light guide plates may be deformed or damaged depending on strength of the connection plate.

Therefore, in the present disclosure, a novel and modified head-mounted display capable of preventing deformation or damage of an image display apparatus due to concentration of an external force on a part of the image display apparatus is proposed.

Solution to Problem

According to the present disclosure, a head-mounted display is provided that includes: a frame worn on a head of an observer; an image display apparatus that is connected to a central part of the frame in a left-right direction and that includes an image forming apparatus; and an optical member that is connected to the image forming apparatus and arranged in front of left and right eyes of the observer; and a rotation restricting unit that is arranged opposite to, across a predetermined gap in a front-rear direction, one of the optical member and an extended part that extends from the optical member.

Advantageous Effects of Invention

As described above, according to the present disclosure, it is possible to provide a head-mounted display capable of preventing deformation or damage of an image display apparatus due to concentration of an external force on a part of the image display apparatus.

Further, the effects described above are not limitative. That is, with or in the place of the above effects, any of the effects described in this specification or other effects that can be recognized from this specification may be achieved.

DESCRIPTION OF EMBODIMENTS

Preferred embodiments of the present disclosure will be described in detail below with reference to the accompanying drawings. In this specification and the drawings, structural elements that have substantially the same functions and configurations will be denoted by the same reference symbols, and repeated explanation of the structural elements will be omitted.

In addition, hereinafter, explanation will be given in the following order.
1. Entire configuration example of head-mounted display
2. Configuration example and operation of optical module
3. Rotation restricting unit
4. Modifications of rotation restricting unit In this specification, a "front-rear direction" indicates a direction that goes along a front direction in which a user's face is turned when the user (observer) wears a head-mounted display on his/her head, and a "left-right direction" indicates a direction that goes along a left-right direction of the user's face when the user wears the head-mounted display on his/her head. In this specification, a term "right" or "left" is used with respect to a state in which the user's face is viewed from front. Further, when a "top side" or a "back side" is referred to, the "top side" indicates a front side in the front-rear direction, and the "back side" indicates a rear side in the front-rear direction.

<1. Entire Configuration Example of Head-Mounted Display>

Figure 1:
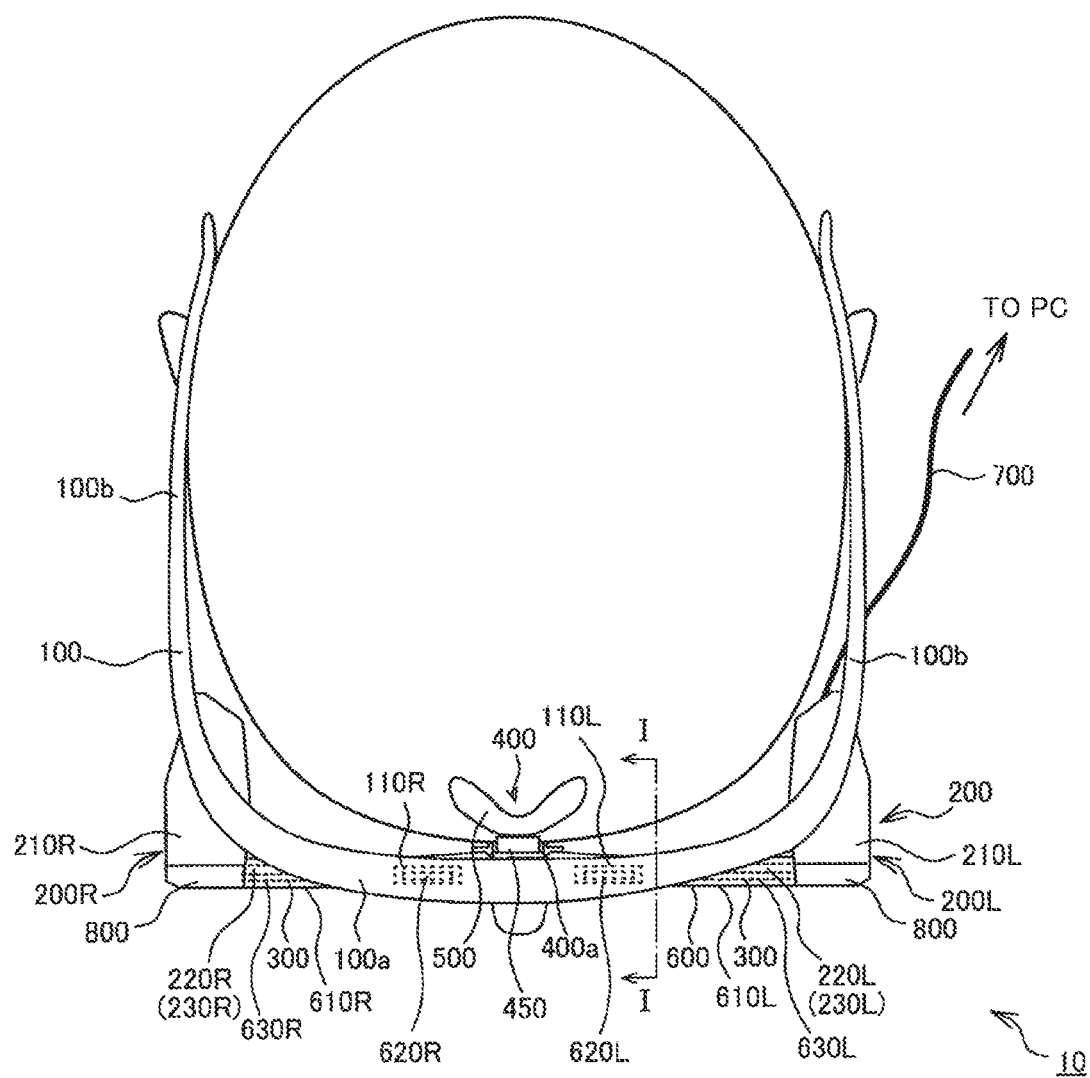
FIG. 1 is a plan view of a head-mounted display according to an embodiment of the present disclosure.
Figure 2:
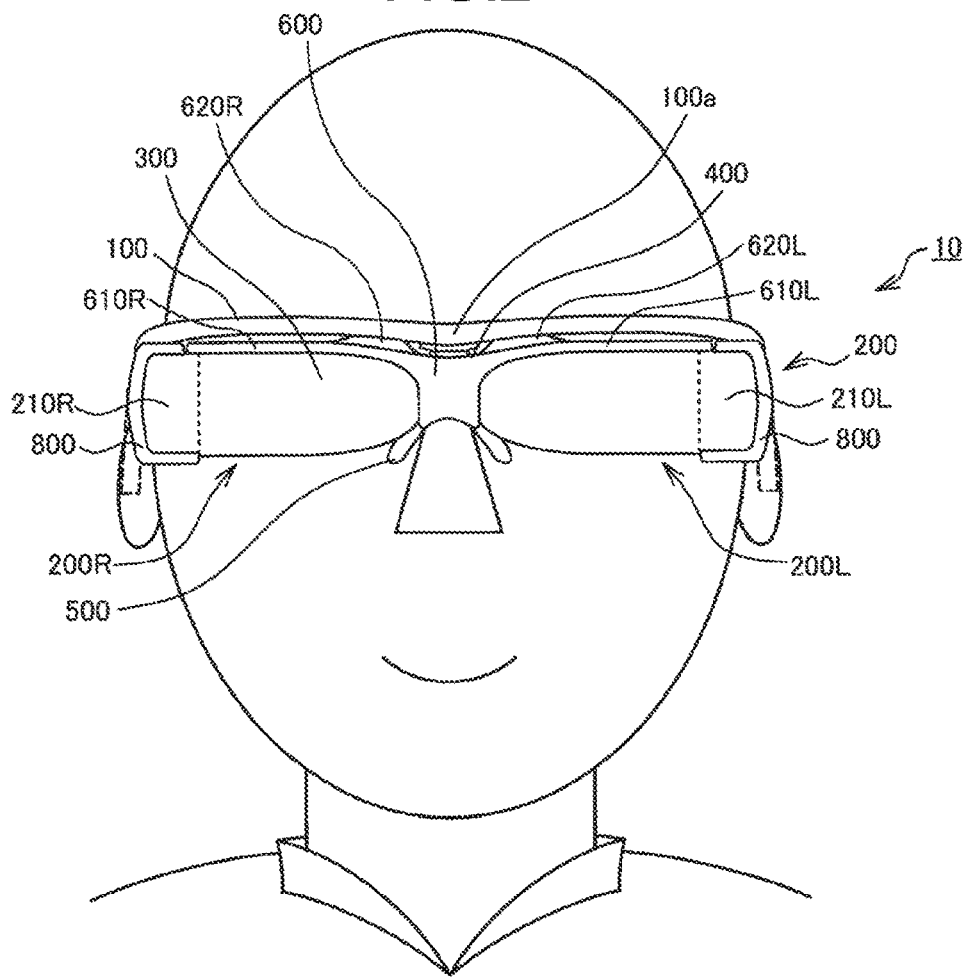
FIG. 2 is a front view of the head-mounted display according to the embodiment.
Figure 3:
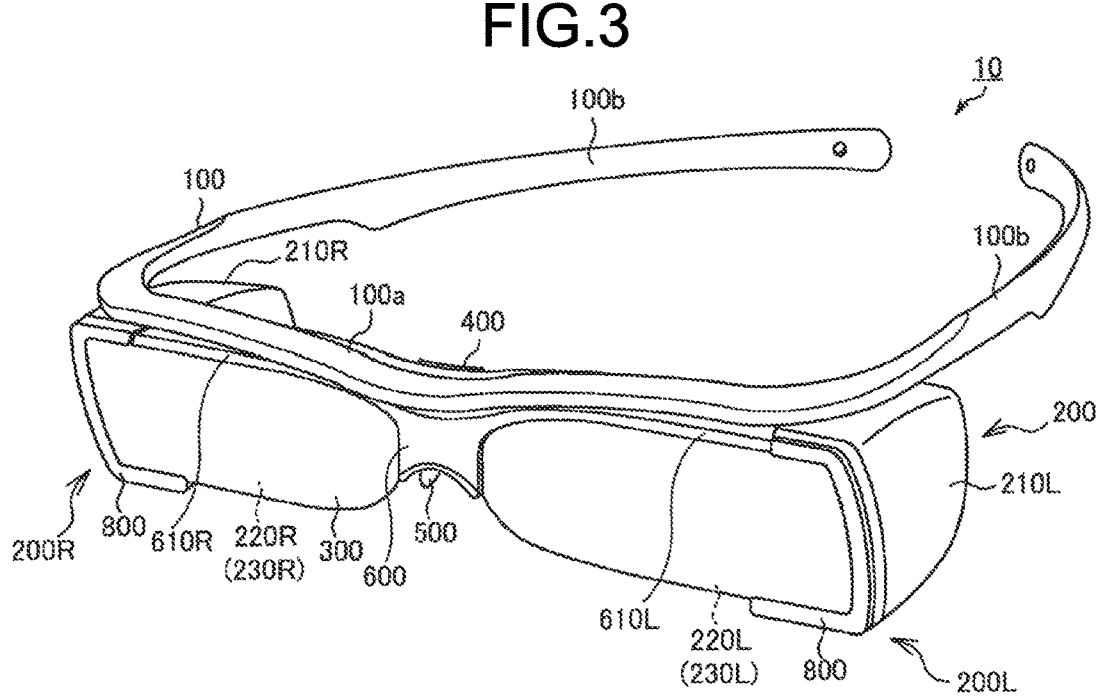
FIG. 3 is a front perspective view of the head-mounted display according to the embodiment.
Figure 4:
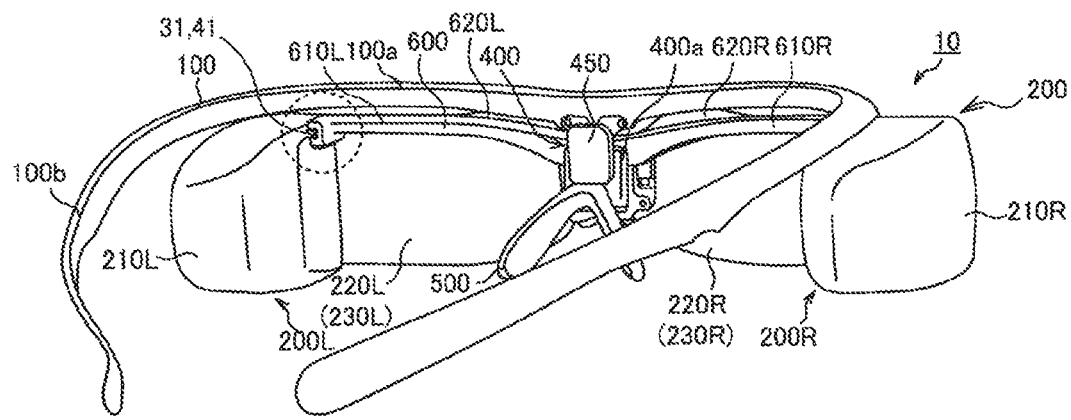
FIG. 4 is a rear perspective view of the head-mounted display according to the embodiment.
Figure 5:
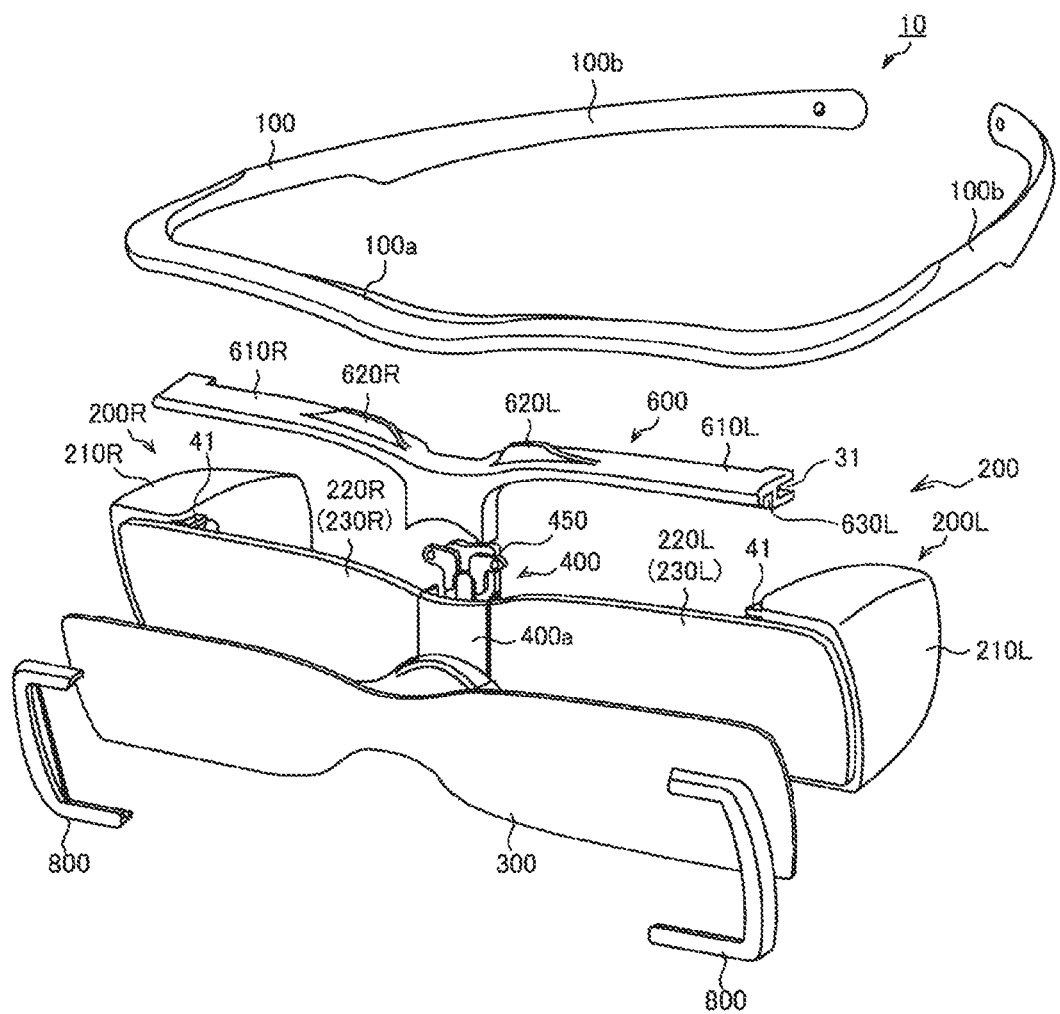
FIG. 5 is an exploded perspective view of the head-mounted display according to the embodiment.

First, an entire configuration example of a head-mounted display 10 according to a first embodiment of the present disclosure will be described with reference to FIG. 1 to FIG. 5. FIG. 1 is a plan view of the head-mounted display 10. FIG. 2 is a front view of the head-mounted display 10. FIG. 3 is a front perspective view of the head-mounted display 10. FIG. 4 is a rear perspective view of the head-mounted display 10. FIG. 5 is an exploded perspective view of the head-mounted display 10.

The head-mounted display 10 according to the present embodiment includes a frame 100 and an image display apparatus 200. The frame 100 is a part that is mounted on a head of a user. The frame 100 includes a front part 100a that is arranged at the front of the head, and two temple parts 100b that are connected from both of left and right ends of the front part 100a. The frame 100 according to the present embodiment may have substantially the same structure as that of a frame used in normal eyeglasses. A material that constitutes the frame 100 may be the same as a material, such as metal, alloy, plastic, or a combination of these materials, that constitutes normal eyeglasses.

Meanwhile, in the present embodiment, the frame 100 is configured such that the front part 100a and the temple parts 100b are integrally connected, but the frame 100 may be configured such that the front part 100a and the temple parts 100b can be folded at a hinge used as a supporting point.

The image display apparatus 200 includes two left and right optical modules 200L and 200R, a connection plate 300, a reinforcing member 600, and a joint member 400.

The two left and right optical modules 200L and 200R generate virtual images for a left eye and a right eye, and emit light to the respective eyes. The optical module 200L includes an image forming apparatus 210L and a light guide unit 230L including a light guide plate 220L. The image forming apparatus 210L and the light guide plate 220L are bonded together with an adhesive agent or the like such that a position of the image forming apparatus 210L relative to the light guide plate 220L is not misaligned. The light guide unit 230L is arranged on the center side in the left-right direction on the face of the user relative to the image forming apparatus 210L.

Similarly, the optical module 200R includes an image forming apparatus 210R and a light guide unit 230R including a light guide plate 220R. The image forming apparatus 210R and the light guide plate 220R are bonded together with an adhesive agent or the like such that a position of the image forming apparatus 210R relative to the light guide plate 220R is not misaligned. The light guide unit 230R is arranged on a center side in the left-right direction of the face of the user relative to the image forming apparatus 210R. In this manner, the image forming apparatuses 210L and 210R are connected, in a one-to-one manner, to the light guide plates 220L and 220R that are, as a whole, arranged on the center side of the face of the user relative to the image forming apparatuses 210L and 210R. In the present embodiment, the light guide plates 220L and 220R are one example of an optical plate in the technology of the present disclosure.

The light guide units 230L and 230R include polarizing plates (not illustrated) in addition to the light guide plates 220L and 220R, and cause light emitted from the image forming apparatuses 210L and 210R to enter the light guide plates 220L and 220R. The light guide units 230L and 230R guide light by repeating total reflection at the light guide plates 220L and 220R, and emit the light toward the eyes of the user. Detailed configurations and operation of the optical modules 200L and 200R including the light guide units 230L and 230R will be described later.

The connection plate 300 is bonded on top side surfaces of the left and right light guide plates 220L and 220R, and joins the two left and right optical modules 200L and 200R. The connection plate 300 is a transparent glass flat plate, and is made of, for example, tempered glass. The connection plate 300 is a flat plate in the present embodiment, but need not always be a flat plate as long as it is possible to mount the light guide plates 220L and 220R thereon.

Specifically, a back side surface of the connection plate 300 and the top side surfaces of the two light guide plates 220L and 220R are bonded at respective peripheral portions of the light guide plates 220L and 220R by using adhesive agents including bead spacers with diameters of about 30 micrometers (μm) (not illustrated), for example. Accordingly, the two light guide plates 220L and 220R are bonded to the connection plate 300 in such a manner that a micro airspace is formed between the connection plate 300 and each of the light guide plates 220L and 220R, so that the two optical modules 200L and 200R are joined. In the present embodiment, the top side surfaces of the two light guide plates 220L and 220R need to act as internal total reflection surfaces, so that the airspaces is formed between the connection plate 300 and each of the light guide plates 220L and 220R.

Meanwhile, in the present embodiment, the light guide plates 220L and 220R as one example of an optical plate, the polarizing plate (not illustrated), and the connection plate 300 are integrally arranged in front of the left and right eyes of the user, and have functions as an optical member in the technology of the present disclosure. Further, the optical member may include a cover glass that protects an opposite side of the connection plate 300 across the light guide plates 220L and 220R, i.e., the light guide plates 220L and 220R that are arranged on the back side surfaces of the light guide plates 220L and 220R.

The joint member 400 connects the image display apparatus 200 to the front part 100a of the frame 100. The joint member 400 is bonded to a central part of the connection plate 300 on the back side surface of the connection plate 300 facing the user's face side. As a material of the joint member 400, plastic, glass fiber, carbon, metal such as aluminum, magnesium, stainless, or titanium, alloy, or a combination of these materials is preferable.

The joint member 400 includes a metal plate 400a as a reinforcing material and a frame mounting member 450. A nose pad 500 is attached to the joint member 400. The metal plate 400a and the frame mounting member 450 are formed as an integrated stay, and the metal plate 400a and the frame mounting member 450 are bonded to the central part of the connection plate 300 in the left-right direction with an adhesive agent or the like. The joint member 400 may be formed in an arbitrary shape, e.g., may be formed in a rectangle.

The joint member 400 is attached to a central part (corresponding to a bridge part of normal eyeglasses) of the front part 100a located between the two eyes of the user by using, for example, a screw. Therefore, the image display apparatus 200 is connected to only the central part of the front part 100a in the left-right direction. The joint member 400 also has a function to reinforce the central part of the connection plate 300 in the left-right direction and increase the rigidity of the connection plate 300.

The reinforcing member 600 reinforces the connection plate 300 on a top side surface of the central part of the connection plate 300. A central part of the reinforcing member 600 is bonded to the central part of the connection plate 300 on the top side surface of the connection plate 300 facing the opposite side of the user's face side. In other words, the central part of the reinforcing member 600 is bonded to a rear surface side of a bonding surface with respect to the joint member 400 in the connection plate 300. The reinforcing member 600 is bonded to the central part of the connection plate 300 with, for example, an adhesive agent or the like. As a material of the reinforcing member 600, plastic, glass fiber, carbon, metal such as aluminum, magnesium, stainless, or titanium, alloy, or a combination of these materials is preferable.

In the glasses-type head-mounted display 10 according to the present embodiment, the connection plate 300 joins and supports the two left and right optical modules 200L and 200R. The light guide plates 220L and 220R are respectively bonded to the left and right sides of the connection plate 300 except for the central part of the connection plate 300, and integrated with the connection plate 300. The connection plate 300 has a recess at the central part corresponding to a position of a nose of the user, and therefore, the connection plate 300 is likely to be distorted and breakdown strength is likely to be reduced in the vicinity of the recess. Therefore, the joint member 400 is bonded to the back side surface of the central part of the connection plate 300 and the central part of the reinforcing member 600 is bonded to the top side surface of the central part of the connection plate 300. With this configuration, the central part of the connection plate 300 is reinforced.

Further, the connection plate 300 and the light guide plates 220L and 220R are reinforced by rails 800 at outer edge portions of both ends thereof, and fixed to top sides of the two image forming apparatuses 210L and 210R (see FIG. 3 and FIG. 5). In the head-mounted display 10 according to the present embodiment, the metal plate 400a of the joint member 400 and the central part of the reinforcing member 600 are bonded to the central part of the connection plate 300, and the both edges of the connection plate 300 and the light guide plates 220L and 220R are held by the rails 800, so that the breakdown strength of the connection plate 300 is increased.

The reinforcing member 600 includes reinforcing parts 610L and 610R that extend leftward and rightward from the central part bonded to the connection plate 300, and has a horizontally symmetrical shape. The reinforcing parts 610L and 610R include restriction ribs 620L and 620R that protrude upward from upper surfaces. Parts of the restriction ribs 620L and 620R are disposed inside restriction grooves 110L and 110R that are arranged below a lower surface of the front part 100a of the frame 100 (see FIG. 1). The restriction ribs 620L and 620R of the reinforcing member 600 and the restriction grooves 110L and 110R of the front part 100a have functions to restrict a movement range of relative rotation between the frame 100 and the image display apparatus 200, in a cooperative manner.

For example, in the one optical module 200R, the restriction rib 620R of the reinforcing member 600 and the restriction groove 110R of the front part 100a are arranged so as not to come into contact with each other at least in the front-rear direction in a state in which an external force is not applied to the image display apparatus 200. Specifically, the restriction rib 620R is arranged opposite to, across a predetermined gap in the front-rear direction, at least a side surface that faces the user's face side among side surfaces of the restriction groove 110R of the front part 100a. In the other optical module 200L, the restriction rib 620L is arranged opposite to, across a predetermined gap in the front-rear direction, at least a side surface that faces the user's face side among side surfaces of the restriction groove 110L of the front part 100a. With this configuration, it is possible to reduce deformation of the image display apparatus 200 when the left and right temple parts 100b of the frame 100 are stretched in a case where the user wears the head-mounted display 10 on the head.

Furthermore, for example, when the user holds and moves the image forming apparatus 210R forward, and if the frame 100 is stuck on the face and only the image display apparatus 200 rotates, the restriction rib 620R arranged on the reinforcing part 610R of the reinforcing member 600 comes into contact with a side surface of the restriction groove 110R of the front part 100a of the frame 100. With this configuration, a movement range of relative rotation of the image display apparatus 200 about a connection position at which the frame 100 and the image display apparatus 200 are connected by the joint member 400 is restricted. Therefore, when an external force is applied to the image display apparatus 200, it is possible to prevent deformation or damage of the joint member 400 due to an excessive increase in a force that acts on the joint member 400.

Shapes of the restriction ribs 620L and 620R and the restriction grooves 110L and 110R are not specifically limited. The restriction ribs 620L and 620R may be formed in bar shapes or plate shapes, or may be formed in other appropriate three-dimensional shapes. The restriction grooves 110L and 110R may be formed in appropriate shapes as long as at least parts of the restriction ribs 620L and 620R can be disposed inside the restriction grooves 110L and 110R. In this case, the restriction grooves 110L and 110R may be formed such that three-dimensional shapes or two-dimensional shapes viewed from above the user are similar to or different from three-dimensional shapes or two-dimensional shapes of the restriction ribs 620L and 620R.

Furthermore, the restriction grooves 110L and 110R are not limited to concave portions arranged on the lower surface of the front part 100a, but may be formed as holes that penetrate through the front part 100a in a vertical direction.

Meanwhile, it is sufficient that the gap between the restriction rib 620R that is a part of the image display apparatus 200 and the side surface of the restriction groove 110R that is a part of the frame 100 is formed at least when the head-mounted display 10 is worn. In other words, it is sufficient that the gap is formed in such a manner that the left and right temple parts 100b of the frame 100 are stretched when the head-mounted display 10 is worn.

Moreover, the reinforcing parts 610L and 610R include groove portions 630L and 630R (see FIG. 1 and FIG. 5) in which upper end portions of the light guide plates 220L and 220R of the left and right optical modules 200L and 200R and the connection plate 300 are disposed. The groove portions 630L and 630R are arranged on respective lower surfaces of the left and right reinforcing parts 610L and 610R. In the present embodiment, the groove portions 630L and 630R of the reinforcing member 600 have functions to restrict rotation movement ranges of the light guide plates 220L and 220R and the connection plate 300.

Engaging grooves 31 are arranged in both end portions of the left and right reinforcing parts 610L and 610R. The engaging grooves 31 are engaged with engaging protrusions 41 arranged on the image forming apparatuses 210L and 210R. The engaging grooves 31 of the reinforcing member 600 and the engaging protrusions 41 of the image forming apparatuses 210L and 210R have functions to restrict, in a cooperative manner, displacement among the light guide plates 220L and 220R, the connection plate 300, and the groove portions 630L and 630R in a vertical direction.

A wiring 700 connected to, for example, a personal computer (PC) is extended from the image forming apparatus 210L that is one of the two image forming apparatuses 210L and 210R (see FIG. 1), and image data is transmitted from the PC to the image forming apparatus 210L. The one image forming apparatus 210L and the other image forming apparatus 210R are connected to each other via a flexible wiring substrate (not illustrated) that is arranged on, for example, an upper surface of the connection plate 300, and image data is also transmitted from the PC to the other image forming apparatus 210R. The wiring 700 may be connected to the other image forming apparatus 210R. Further, the wiring may be connected to each of the two image forming apparatuses 210L and 210R. The PC and the two image forming apparatuses 210L and 210R may perform data communication in a wireless manner.

<2. Configuration Example and Operation of Optical Module>

Figure 6:
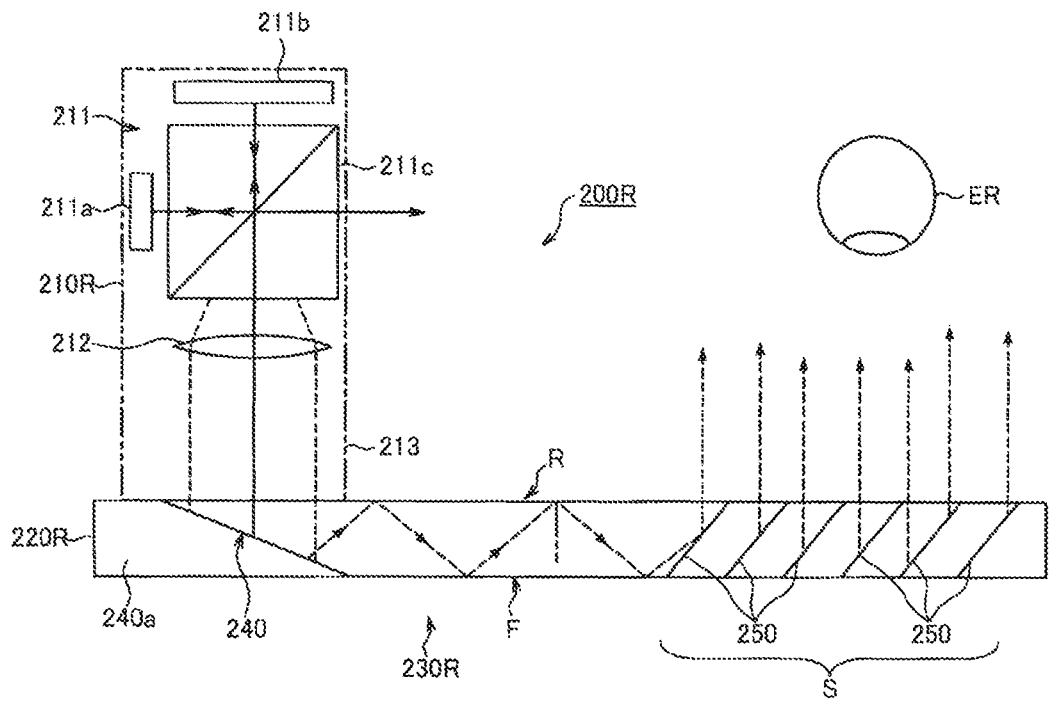
FIG. 6 is a diagram for explaining an optical module of the head-mounted display according to the embodiment.

A configuration example and operation of the two optical modules 200L and 200R will be described below with reference to FIG. 6. FIG. 6 is a conceptual diagram of the optical module 200R that is one of the two optical modules 200L and 200R. The optical module 200L is arranged so as to be bilaterally symmetric to the optical module 200R and has the same structure as that of the optical module 200R; therefore, explanation of the optical module 200L will be omitted.

The optical module 200R includes the image forming apparatus 210R and the light guide unit 230R. The image forming apparatus 210R includes an image forming unit 211 and a collimator optical system 212. The image forming unit 211 and the collimator optical system 212 are housed in a housing 213 (indicated by a chain line). An opening (not illustrated) is arranged in the housing 213, and light is emitted from the collimator optical system 212 via the opening. The housing 213 is bonded to the light guide unit 230R.

The image forming unit 211 includes a plurality of pixels that are arranged in a two-dimensional matrix manner. The collimator optical system 212 functions to cause the light emitted from the pixels of the image forming unit 211 to become parallel light. The light that is caused to become parallel light by the collimator optical system 212 is incident on the light guide plate 220R, is guided, and is emitted.

The image forming unit 211 includes a light source 211a, a liquid crystal display (LCD) apparatus 211b, and a polarizing beam splitter 211c. The liquid crystal display apparatus 211b and the polarizing beam splitter 211c constitute a reflective spatial light modulating unit. The liquid crystal display apparatus 211b is constructed with, for example, a liquid crystal on silicon (LCOS) as a light bulb. The polarizing beam splitter 211c reflects a part of light emitted from the light source 211a, guides the light to the liquid crystal display apparatus 211b, transmits a part of light reflected by the liquid crystal display apparatus 211b, and guides the light to the collimator optical system 212.

The liquid crystal display apparatus 211b includes a plurality of pixels that are arranged in a two-dimensional matrix manner. The polarizing beam splitter 211c may have a well-known configuration or structure. Non-polarized light emitted from the light source 211a hits the polarizing beam splitter 211c. In this case, a p-polarized component of light passes through the polarizing beam splitter 211c and is emitted to the outside of the system. In contrast, an s-polarized component of the light is reflected by the polarizing beam splitter 211c, is incident on the liquid crystal display apparatus 211b, is reflected inside the liquid crystal display apparatus 211b, and is emitted from the liquid crystal display apparatus 211b.

Here, among light emitted from the liquid crystal display apparatus 211b, light emitted from pixels representing "white" includes a large amount of p-polarized components, and light emitted from pixels representing "black" includes a large amount of s-polarized components. Therefore, the p-polarized components in light that is emitted from the liquid crystal display apparatus 211*b* and that hits the polarizing beam splitter 211*c* pass through the polarizing beam splitter 211*c* and are guided to the collimator optical system 212. In contrast, the s-polarized components are reflected by the polarizing beam splitter 211*c* and returned to the light source 211*a*.

The liquid crystal display apparatus 211*b* includes, for example, pixels of 320×240 that are arranged in a two-dimensional matrix manner (the number of liquid crystal cells is, for example, three times the number of pixels). For example, the collimator optical system 212 is constructed with, for example, a convex lens, and the liquid crystal display apparatus 211*b* is arranged at a position at a focal distance in the collimator optical system 212 in order to generate parallel light. Further, a single pixel is constructed of a red light-emitting sub pixel that emits a red color, a green light-emitting sub pixel that emits a green color, and a blue light-emitting sub pixel that emits a blue color.

The light guide unit 230R includes a light guide plate 220R, a first polarizing unit 240, and a second polarizing unit 250. Incident light propagates while being totally reflected inside the light guide plate 220, and is emitted.

The first polarizing unit 240 reflects the light incident on the light guide plate 220R such that the light incident on the light guide plate 220R is totally reflected inside the light guide plate 220R. The first polarizing unit 240 is constructed with, for example, metal including aluminum or alloy, and may be constructed with an optical reflection coating (a kind of mirror) that reflects light incident on the light guide plate 220R or a diffraction grating (for example, a hologram diffraction grating film) that diffracts light incident on the light guide plate 220R.

The second polarizing unit 250 is configured to repeatedly transmit and reflect light that has propagated while being totally reflected inside the light guide plate 220R. The second polarizing unit 250 is configured with, for example, an optical reflection multi-layer film having a multi-layer laminated structure, and emits a plurality of beams of light from the light guide plate 220R. In this configuration, a mirror is arranged inside of an incident side, a half mirror film is arranged on an emission side, the first polarizing unit 240 functions as a reflecting mirror, and the second polarizing unit 250 functions as a semi-transmissive mirror.

The second polarizing unit 250 may be configured with a multi-layer laminated structure in which a plurality of dielectric laminated films are laminated, a half mirror, a polarizing beam splitter, or a hologram diffraction grating film. The dielectric laminated films are made with, for example, a $TiO_2$ film as a high-permittivity material and a $SiO_2$ film as a low-permittivity material. The multi-layer laminated structure in which a plurality of dielectric laminated films are laminated is disclosed in Japanese Laid-open Patent Publication No. 2005-521099. In the drawings, six dielectric laminated films are illustrated, but embodiments are not limited thereto. A thin section made of the same material as a material of the light guide plate 220R is sandwiched between a dielectric laminated film and another dielectric laminated film.

Meanwhile, in the first polarizing unit 240, the parallel light incident on the light guide plate 220R is reflected (or diffracted) such that the parallel light incident on the light guide plate 220R is totally reflected inside the light guide plate 220R. In contrast, in the second polarizing unit 250, the parallel light that has propagated by being totally reflected inside the light guide plate 220R is repeatedly reflected (or diffracted), and emitted in the state of being parallel light from the light guide plate 220R.

The first polarizing unit 240 may be constructed such that a slope for forming the first polarizing unit 240 is prepared in the light guide plate 220R by cutting out a portion 240*a* on which the first polarizing unit 240 of the light guide plate 220R is to be arranged, an optical reflection film is vacuum-deposited on the slope, and thereafter the cut-out portion 240*a* of the light guide plate 220R is bonded to the first polarizing unit 240. Further, the second polarizing unit 250 may be constructed such that a multi-layer laminated structure in which the same material (for example, glass) as the material of the light guide plate 220R and dielectric laminated layers (for example, may be formed by a vacuum deposition method) are laminated is formed, a slope is prepared by cutting out a portion S on which the second polarizing unit 250 of the light guide plate 220R is to be arranged, the multi-layer laminated structure is bonded to the slope, and grinding or the like is performed to adjust an outer shape. With this configuration, the light guide unit 230R including the first polarizing unit 240 and the second polarizing unit 250 inside the light guide plate 220R is formed.

The light guide plate 220R includes two parallel surfaces (a first surface F and a second surface R) that extend parallel to an axis line (Y-direction) of the light guide plate. The first surface F and the second surface R face each other. Here, if it is assumed that a surface on which light is incident in the light guide plate 220R is referred to as a light guide plate incidence surface, and a surface from which light is emitted in the light guide plate 220R is referred to as a light guide plate emission surface, the first surface F may be configured as the light guide plate incidence surface and the light guide plate emission surface, or the second surface R may be configured as the light guide plate incidence surface and the light guide plate emission surface. In this example, parallel light is incident on the first surface F corresponding to the light incidence surface, propagates while being totally and internally reflected, and thereafter emitted from the second surface R corresponding to the light emission surface.

Examples of a material that constructs the light guide plate 220R include a glass including a quartz glass, an optical glass, such as BK7, and a plastic material (for example, PMMA, polycarbonate resin, acrylic resin, amorphous polypropylene resin, styrene resin including AS resin). A shape of the light guide plate 220R is not limited to a flat plate, but may be a curved shape.

With this configuration as described above, the light guide units 230L and 230R arranged in the head-mounted display 10 guide the light emitted from the image forming apparatuses 210L and 210R by causing the light to be repeatedly and totally reflected by the light guide plates 220L and 220R. The connection plate 300 is bonded on the total reflection surfaces of the light guide plates 220L and 220R. The light that propagates through the light guide plates 220L and 220R are guided while being totally reflected, and therefore, if the light guide plates 220L and 220R are damaged or get dirty, wave-guiding may be stopped or an optical path may be deviated. Therefore, the connection plate 300 protects the light guide plates 220L and 220R and prevents the surfaces of the light guide plates 220L and 220R from being damaged or getting dirty so that total reflection can be reliably performed on the light guide plates 220L and 220R. Similarly, the reason why the airspaces are formed between the connection plate 300 and each of the light guide plates 220L and 220R is to reliably cause the light to be totally reflected with the aid of the airspaces.

<3. Rotation Restricting Unit>

The rotation restricting unit that restricts a movement range of relative rotation between the frame 100 and the image display apparatus 200 will be described in detail below.

(3.1. Necessity of Rotation Restricting Unit)

Figure 7:
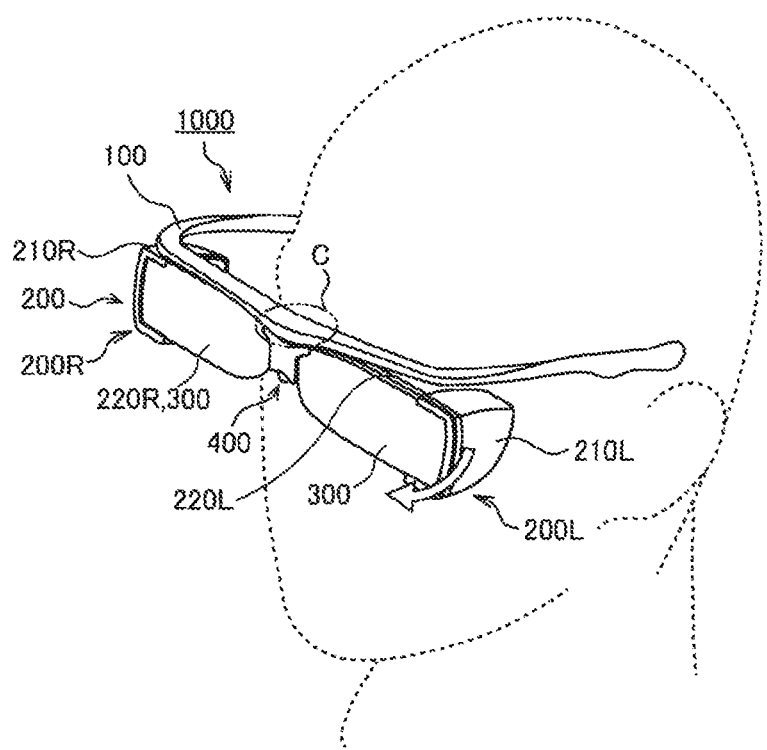
FIG. 7 is a diagram for explaining a state in which an external force is applied to a conventional head-mounted display.

First, necessity of the rotation restricting unit will be described with reference to FIG. 7. FIG. 7 is a diagram for explaining a state in which an external force is applied to a conventional head-mounted display 1000 that does not include a rotation restricting unit.

For example, it is assumed that when a user removes the head-mounted display 1000 from his/her face, the user holds the image forming apparatus 210L of the left optical module 200L and moves it forward. When the frame 100 and the image display apparatus 200 are connected at only a central part in the left-right direction, and if the frame 100 is stuck on the face for some reasons, only the image display apparatus 200 moves. In this case, when viewed from above the user, a force acts on the image display apparatus 200 in a clockwise direction about a connection position C at which the image display apparatus 200a and the frame 100 are connected by the joint member 400. Then, if the force that acts on the image display apparatus 200 excessively increases, convergence angles may be changed due to deformation of the light guide plates 220L and 220R, or the light guide plates 220L and 220R may be damaged.

As described above, in the head-mounted display 1000 according to the present embodiment, the restriction groove 110L arranged on the frame 100 and the restriction rib 620L arranged on the reinforcing member 600 restrict the movement range of relative rotation between the frame 100 and the image display apparatus 200. Therefore, when the relative rotation among the light guide plate 220L, the connection plate 300, and the reinforcing member 600 is not restricted, and if an external force is applied to the image forming apparatus 210L, the convergence angle may be changed due to deformation of the light guide plate 220L or the connection plate 300, or the light guide plate 220L or the connection plate 300 may be damaged.

In particular, when the user holds the image forming apparatus 210L and removes the head-mounted display 1000 from his/her face, a position at which an external force is applied to the image display apparatus 200 is located most distant from the central part at which the joint member 400 and the reinforcing member 600 are bonded. Therefore, even a relatively small force causes the image display apparatus 200 to be deformed or damaged.

In contrast, if the movement range of the relative rotation about the connection position C among the frame 100, the light guide plate 220L, and the connection plate 300 is restricted, it becomes possible to reduce deformation or damage of the image display apparatus 200.

(3.2. Configuration Example of Rotation Restricting Unit)

Figure 8:
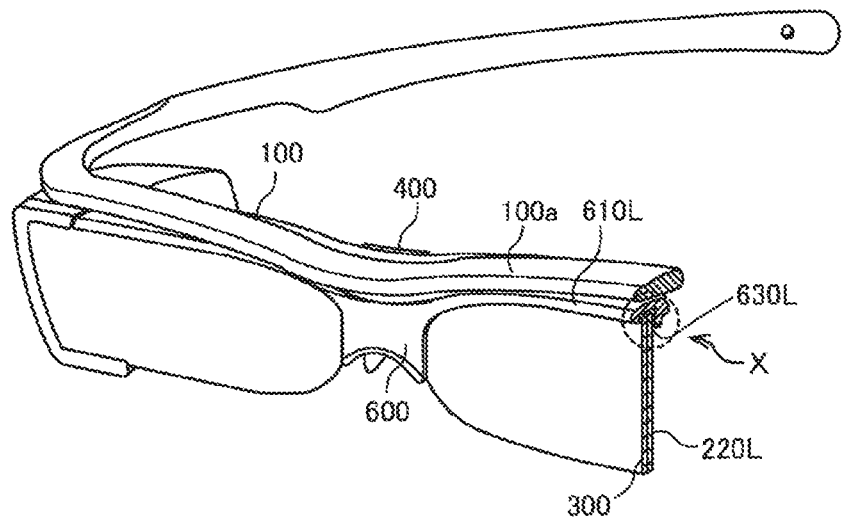
FIG. 8 is a diagram for explaining a configuration example of a rotation restricting unit according to the embodiment.
Figure 9:
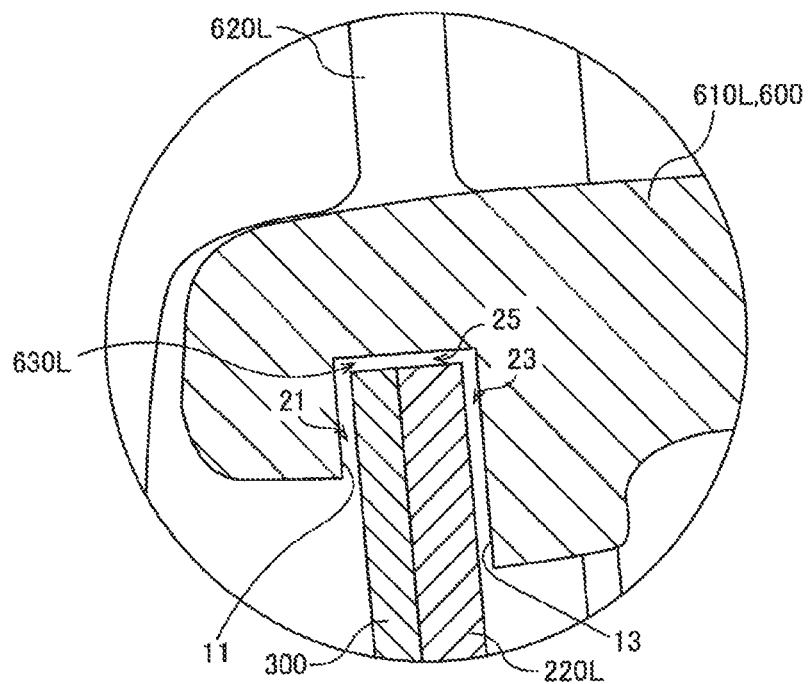
FIG. 9 is a cross-sectional view illustrating a configuration example of the rotation restricting unit according to the embodiment.

FIG. 8 and FIG. 9 are diagrams for explaining the rotation restricting unit arranged on the left optical module 200L. FIG. 8 is a perspective view including a cross-section of the head-mounted display 10 cut at a position I-I in FIG. 1, and FIG. 9 is an enlarged cross-sectional view of a range X in FIG. 8 in the I-I cross-section. In the present embodiment, the side surfaces of the groove portions 630L and 630R function as the rotation restricting unit, and the rotation restricting unit of the left optical module 200L and the rotation restricting unit of the right optical module 200R have the same configurations. Here, the rotation restricting unit of the left optical module 200L will be described as an example.

As illustrated in FIG. 9, a groove portion 630L is formed on a lower surface of the reinforcing part 610L of the reinforcing member 600. In the groove portion 630L, upper end portions of the light guide plate 220L of the optical module 200L and the connection plate 300 are arranged. A top side surface of the upper end portion of the connection plate 300 is arranged opposite to, across a predetermined gap 21 in the front-rear direction, a side surface 11 that faces the user's face among side surfaces of the groove portion 630L of the reinforcing member 600. Further, a back side surface of the upper end portion of the light guide plate 220L is arranged opposite to, across a predetermined gap 23 in the front-rear direction, a side surface 13 that faces a side opposite to the user's face among the side surfaces of the groove portion 630L of the reinforcing member 600. Furthermore, a gap 25 is arranged between each of upper end surfaces of the light guide plate 220L and the connection plate 300 and a bottom surface of the groove portion 630L (a surface facing downward).

With this configuration, the light guide plate 220L and the connection plate 300 are not completely fixed to the reinforcing part 610L that extends leftward from the central part of the reinforcing member 600. In other words, the reinforcing member 600 is not fixed to the light guide plate 220L and the connection plate 300 at positions other than the central part in the left-right direction. The gaps 21, 23, and 25 are arranged between each of the light guide plate 220L and the connection plate 300 and the reinforcing part 610L of the reinforcing member 600, so that the convergence angle is not influenced by the reinforcing member 600 while an external force is not applied to the image display apparatus 200.

However, when an external force is applied to the optical module 200L for example, the reinforcing member 600 and each of the light guide plate 220L and the connection plate 300 can relatively rotate about the central part that is a bonding portion of them. The upper end portion of the connection plate 300 comes into contact with the side surface 11 of the groove portion 630L, so that the movement range of the light guide plate 220L and the connection plate 300 in a forward direction relative to the reinforcing part 610L of the reinforcing member 600 is restricted. In other words, the side surface 11 of the groove portion 630L functions as the rotation restricting unit that restricts the movement range of the light guide plate 220L and the connection plate 300 in the forward direction. Further, the upper end portion of the light guide plate 220L comes into contact with the side surface 13 of the groove portion 630L, so that the movement range of the light guide plate 220L and the connection plate 300 in a rearward direction relative to the reinforcing part 610L of the reinforcing member 600 is restricted. In other words, the side surface 13 of the groove portion 630L functions as the rotation restricting unit that restricts the movement range of the light guide plate 220L and the connection plate 300 in the rearward direction.

Therefore, as compared to a case in which the movement range of the relative rotation between the reinforcing part 610L of the reinforcing member 600 and each of the light guide plate 220L and the connection plate 300 is not restricted, it is possible to reduce the degree of deformation of the light guide plate 220L and the connection plate 300. With this configuration, even when an external force is applied to the image display apparatus 200, it is possible to easily secure the convergence angle and reduce the possibility of damage of the image display apparatus 200.

Meanwhile, to restrict the movement range of the light guide plate 220L and the connection plate 300 when the head-mounted display 10 is removed from the head, it is sufficient that at least the top side surface of the connection plate 300 and the side surface 11 facing the user's face among the side surfaces of the groove portion 630L are arranged opposite to each other.

The groove portion 630L may be formed in an appropriate shape as long as the upper end portions of the light guide plate 220L and the connection plate 300 can be internally disposed in this shape. In this case, a three-dimensional shape of the groove portion 630L or a two-dimensional shape of the groove portion 630L viewed from above the user may be similar to or different from a three-dimensional shape or a two-dimensional shape of the light guide plate 220L and the connection plate 300 in the state of being bonded together. Further, the groove portion 630L is not limited to a concave portion arranged on the lower surface of the reinforcing part 610L of the reinforcing member 600, but may be formed as a hole that penetrates through the reinforcing part 610L in the vertical direction.

Figure 10:
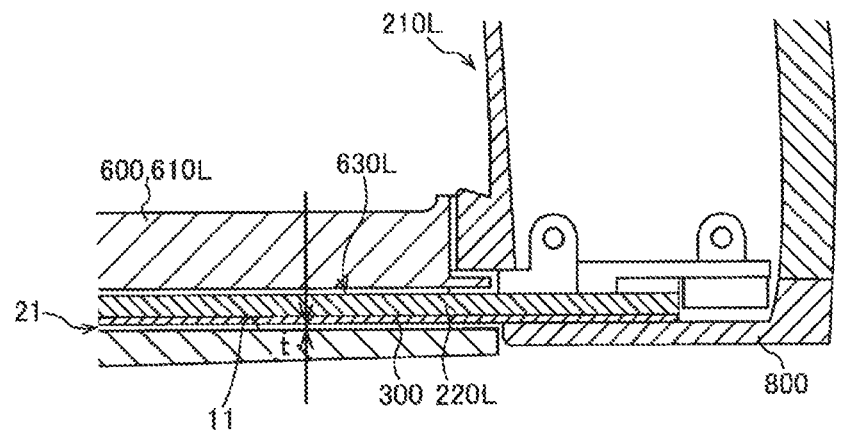
FIG. 10 is a cross-sectional view illustrating a configuration example of the rotation restricting unit according to the embodiment.
Figure 11:
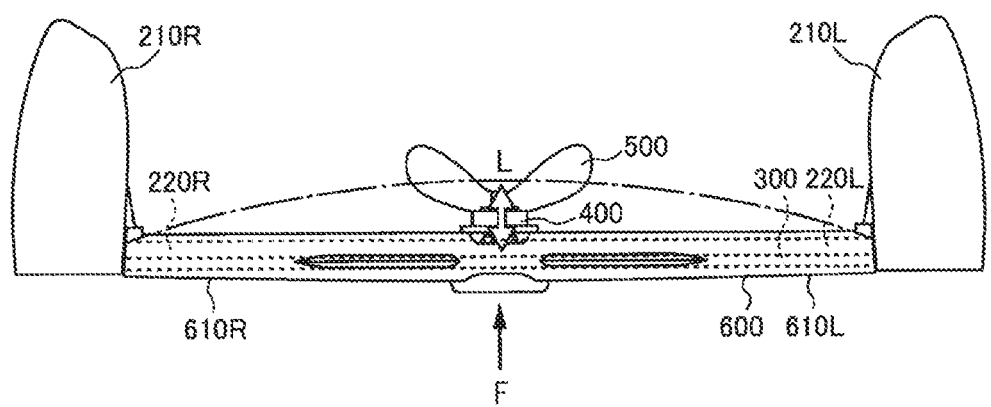
FIG. 11 is an explanatory diagram illustrating a limit displacement amount of a light guide plate and a connection plate with respect to a load.
Figure 12:
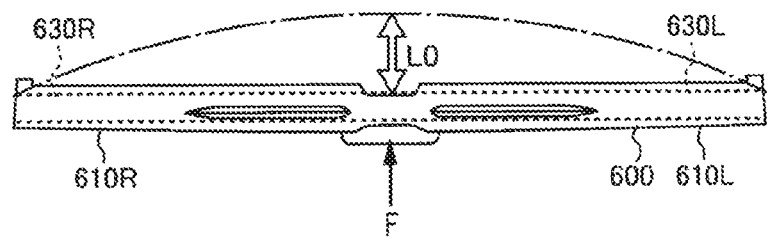
FIG. 12 is a diagram for explaining a displacement amount of a single reinforcing member with respect to a load.

FIG. 10 to FIG. 12 are diagrams for explaining a design condition of the gap 21 between the top side surface of the connection plate 300 and the side surface 11 of the groove portion 630L of the reinforcing member 600, which are arranged opposite to each other. FIG. 10 is a cross-sectional view illustrating a state in which the upper end portions of the light guide plate 220L and the connection plate 300 are arranged inside the groove portion 630L of the reinforcing part 610L of the reinforcing member 600. FIG. 11 illustrates a limit displacement amount L of the light guide plate 220L and the connection plate 300 with respect to a load F, and FIG. 12 illustrates a displacement amount L0 of the single reinforcing member 600 with respect to the load F.

To reduce deformation or damage of the light guide plate 220L and the connection plate 300, it is desirable that a width t of the gap 21 satisfies Equation (1) below.

$$0 < t \le L - L0 \quad (1)$$

L: A design limit displacement amount of the light guide plate 220L and the connection plate 300 with respect to the load F L0: A displacement amount of the single reinforcing member 600 with respect to the load F In other words, to reduce a displacement amount of the light guide plate 220L and the connection plate 300 with respect to the load F to the limit displacement amount L, it is sufficient to set the width t of the gap 21 to a value equal to or lower than a value that is obtained by subtracting the displacement amount L0 of the single reinforcing member 600 from the limit displacement amount L. The limit displacement amount L of the light guide plate 220L and the connection plate 300 is a displacement amount by which the light guide plate 220L and the connection plate 300 bonded together can be displaced without being deformed or damaged, and is a displacement amount that is set by taking into account a safety factor that is determined based on a material or a design condition of the light guide plate 220L or the connection plate 300.

If the width t of the gap 21 between the top side surface of the connection plate 300 and the side surface 11 of the groove portion 630L of the reinforcing member 600 satisfies Equation (1) above, it is possible to improve the effect to reduce deformation or damage of the light guide plate 220L and the connection plate 300 when an external force is applied to the image display apparatus 200.

As for a width t of the gap 23 between the back side surface of the light guide plate 220L and the side surface 13 of the groove portion 630L of the reinforcing member 600, it is preferable to satisfy Equation (1) above with respect to a load in a direction opposite to the direction of the load F illustrated in FIG. 11 and FIG. 12.

Meanwhile, the side surfaces 11 and 13 of the groove portion 630L that function as the rotation restricting unit are arranged in the whole range from the central part of the reinforcing member 600 to an end portion of the reinforcing part 610L; however, the light guide plate 220L and the connection plate 300 may be arranged opposite to the side surfaces 11 and 13 of the groove portion 630L in a part of the range from the central part of the reinforcing member 600 to the end portion of the reinforcing part 610L. In this case, it is preferable to arrange the light guide plate 220L and the connection plate 300 opposite to the side surfaces 11 and 13 at a position closer to the end portion of the reinforcing part 610L relative to the central part of the reinforcing member 600. With this configuration, it is possible to restrict, with a smaller force, relative rotational movement about the bonding portion of the reinforcing member 600 and the connection plate 300.

(3.3. Up-Down Movement Restricting Unit)

The rotation restricting unit of the head-mounted display 10 according to the present embodiment has been described above. To ensure the functions of the rotation restricting unit, the head-mounted display 10 according to the present embodiment includes an up-down movement restricting unit. The left optical module 200L and the right optical module 200R include the up-down movement restricting units having the same configurations. Here, the up-down movement restricting unit of the left optical module 200L will be described as an example.

Figure 13:
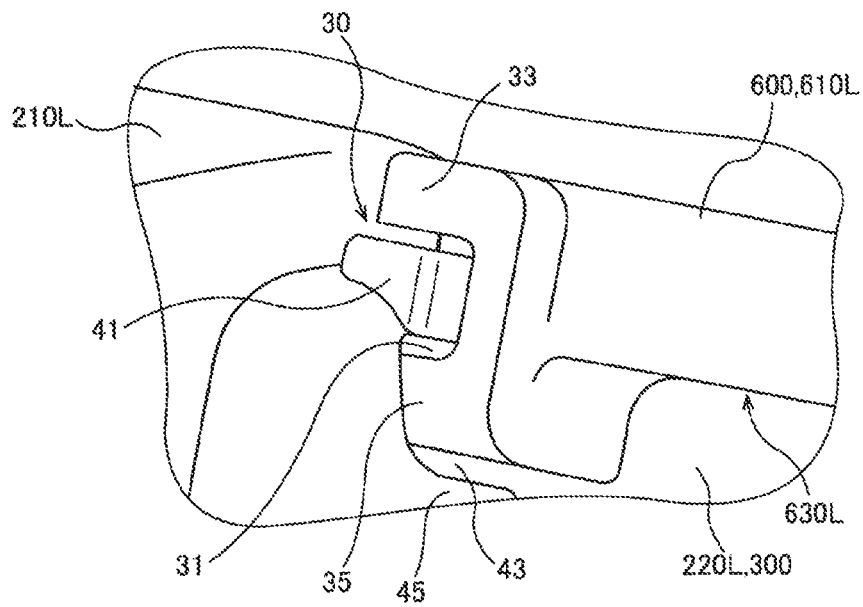
FIG. 13 is a diagram for explaining a configuration example of an up-down movement restricting unit according to the embodiment.

FIG. 13 is an enlarged perspective view of a range Y in FIG. 4. The engaging groove 31 is arranged in the end portion of the reinforcing part 610L that extends leftward from the central part of the reinforcing member 600. The engaging grooves 31 are engaged with the engaging protrusions 41 arranged on the image forming apparatuses 210L and 210R. The engaging grooves 31 and the engaging protrusions 41 function as an up-down movement restricting unit 30 in a cooperative manner. With this configuration, it is possible to reduce the possibility that the end portion of the reinforcing part 610L of the reinforcing member 600 is displaced upward relative to the upper end portions of the light guide plate 220L and the connection plate 300 and becomes unable to function as the rotation restricting unit.

Specifically, in a casing of the image forming apparatus 210L, the engaging protrusion 41 that protrudes toward the central part side is formed on a surface facing the central part in the left-right direction of the head-mounted display 10. Further, a concave portion 43 is formed adjacent to the engaging protrusion 41 below the engaging protrusion 41. The engaging groove 31 sandwiched between an upper wall portion 33 and a lower wall portion 35 in the vertical direction is formed on the end portion of the reinforcing part 610L of the reinforcing member 600.

The engaging protrusion 41 formed in the casing of the image forming apparatus 210L is arranged inside the engaging groove 31 of the reinforcing part 610L. Further, the lower wall portion 35 of the reinforcing part 610L is arranged inside the concave portion 43 that is formed in the casing of the image forming apparatus 210L. With this configuration, the range of relative movement between the reinforcing part 610L of the reinforcing member 600 and the image forming apparatus 210L in the vertical direction is restricted.

A gap is arranged between an external surface of the engaging protrusion 41 and an internal surface of the engaging groove 31, and the engaging protrusion 41 is loosely arranged inside the engaging groove 31. A gap is arranged between an external surface of the lower wall portion 35 and an internal surface of the concave portion 43, and the lower wall portion 35 is loosely arranged inside the concave portion 43. Therefore, in a state in which an external force is not applied to the image display apparatus 200, the light guide plate 220L and the connection plate 300 are prevented from being deformed via the image forming apparatus 210L due to the influence of the reinforcing member 600.

Meanwhile, the configuration of the up-down movement restricting unit 30 illustrated in FIG. 13 is one example, and it may be possible to include other configurations as long as it is possible to appropriately restrict the range of the relative movement between the reinforcing part 610L of the reinforcing member 600 and each of the light guide plate 220L and the connection plate 300 in the vertical direction. For example, in FIG. 13, it may be possible to omit a lower wall portion 45 of the concave portion 43 in the casing of the image forming apparatus 210L.

Further, in FIG. 13, the upper wall portion 33 of the reinforcing member 600 may be omitted. In this case, the lower wall portion 35 of the reinforcing member 600 functions as an engaging protrusion and the concave portion 43 of the casing of the image forming apparatus 210L functions as an engaging groove, so that the up-down movement restricting unit is constructed. Specifically, the lower wall portion 35 of the reinforcing member 600 arranged inside the concave portion 43 comes into contact with the engaging protrusion 41 and the lower wall portion 45 of the casing of the image forming apparatus 210L, so that a movement range of the end portion of the reinforcing part 610L of the reinforcing member 600 in the vertical direction is restricted.

Further, the up-down movement restricting unit 30 illustrated in FIG. 13 is configured by engaging a part of the reinforcing member 600 and a part of the image forming apparatus 210L; however, it may be possible to construct the up-down movement restricting unit by engaging a part of the reinforcing member 600 and a part of the light guide plate 220L or the connection plate 300. Alternatively, it may be possible to construct the up-down movement restricting unit by engaging a part of the reinforcing member 600 and a component part connected to the light guide plate 220L or the connection plate 300.

<4. Modification of Rotation Restricting Unit>

The head-mounted display 10 according to the embodiment of the present disclosure has been described above, but the head-mounted display including the rotation restricting unit may be modified in various ways. Hereinafter, several modifications of the head-mounted display will be described.

(4.1. First Modification)

Figure 14:
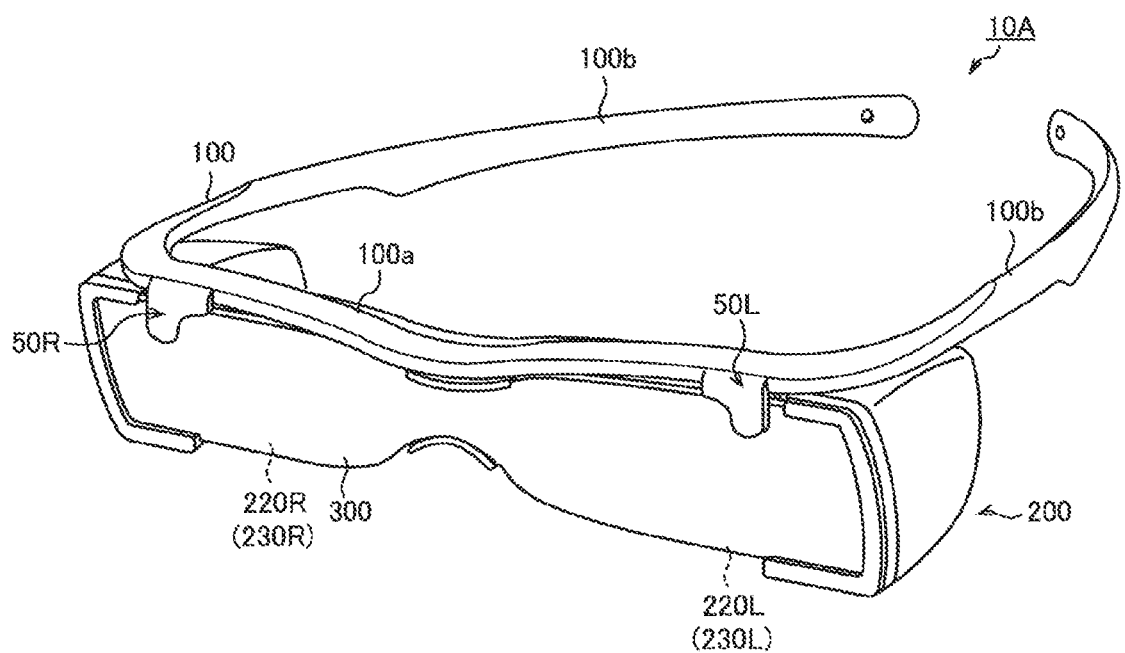
FIG. 14 is a front perspective view of a head-mounted display according to a first modification.
Figure 15:
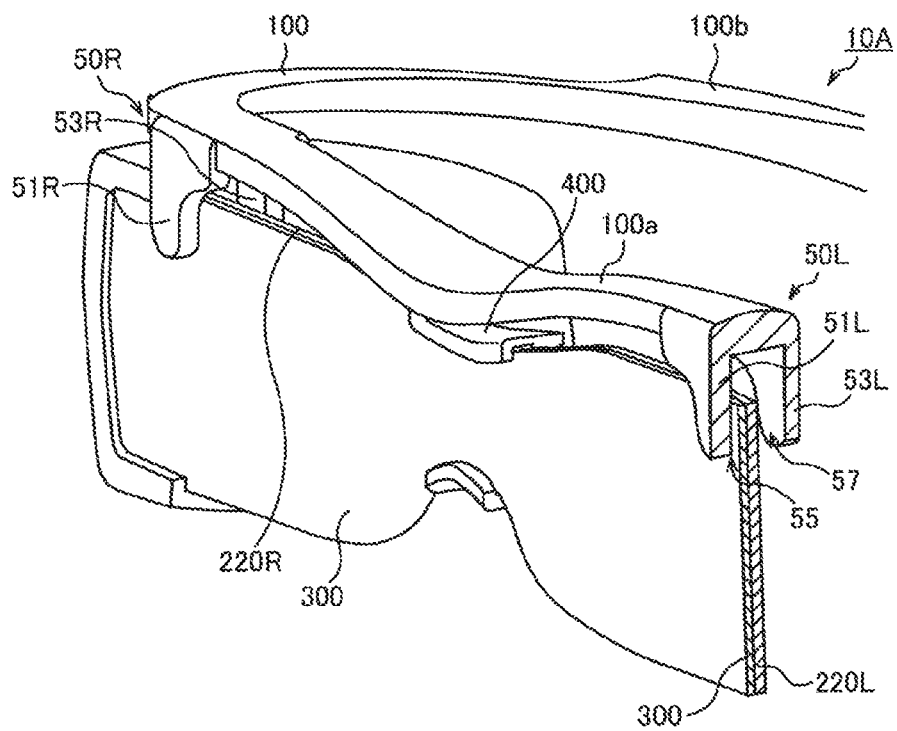
FIG. 15 is a partial cross-sectional view of the head-mounted display according to the first modification.

FIG. 14 and FIG. 15 are diagrams for explaining a head-mounted display 10A according to a first modification. FIG. 14 is a front perspective view of the head-mounted display 10A according to the first modification, and FIG. 15 is a perspective view including cross-sections of a rotation restricting unit 50L, the light guide plate 220L, and the connection plate 300 of the head-mounted display 10A according to the first modification. The head-mounted display 10A according to the first modification does not include the reinforcing member 600 of the head-mounted display 10 according to the embodiment as described above, and the rotation restricting unit 50L and a rotation restricting unit 50R that are arranged opposite to the light guide plate 220L and the connection plate 300 across predetermined gaps in the front-rear direction are constructed as a part of the frame 100.

Specifically, in the front part 100a of the frame 100, the rotation restricting units 50L and 50R that are formed downward from the frame 100 are arranged on the left and the right sides across the central part at which the image display apparatus 200 is connected. The rotation restricting unit 50L that is arranged on the left side relative to the central part in the left-right direction of the frame 100 includes a front rib 51L that is arranged opposite to the top side surface of the connection plate 300, and a rear rib 53L that is arranged opposite to the back side surface of the light guide plate 220L. The front rib 51L is arranged opposite to the user's face side across a gap 55 on a part of the upper end portion of the connection plate 300. The rear rib 53L is arranged on the user's face side across a gap 57 on a part of the upper end portion of the light guide plate 220L.

Similarly, the rotation restricting unit 50R that is arranged on the right side relative to the central part in the left-right direction of the frame 100 includes a front rib 51R that is arranged opposite to the top side surface of the connection plate 300, and a rear rib 53R that is arranged opposite to the back side surface of the light guide plate 220R. The front rib 51R is arranged opposite to the user's face side across a gap on a part of the upper end portion of the connection plate 300. The rear rib 53R is arranged on the user's face side across a gap on a part of the upper end portion of the light guide plate 220R.

A width of each of the gaps 55 and 57 may be set to be larger than the width t that is set in accordance with the design condition represented by Equation (1) in the above-described embodiment. For example, it may be possible to set the widths of the gaps 55 and 57 by taking into account movement amounts of the rotation restricting units 50L and 50R and strengths of the light guide plates 220L and 220R and the connection plate 300 at the time the temple part 100b of the frame 100 is stretched when the user wears the head-mounted display 10A. With the gaps 55 and 57 as described above, when the temple part 100b of the frame 100 is stretched, it is possible to reduce the degree of deformation of the light guide plates 220L and 220R and the connection plate 300.

Meanwhile, the rotation restricting units 50L and 50R illustrated in FIG. 14 and FIG. 15 are arranged at positions on left and right sides separated from the central part of the frame 100, but the positions and the ranges in which the rotation restricting units 50L and 50R are arranged may be set appropriately.

In the head-mounted display 10A according to the first modification, the rotation restricting units 50L and 50R arranged on the frame 100 restrict the movement range of the relative rotation of the light guide plates 220L and 220R and the connection plate 300 with respect to the frame 100. With this configuration, even when an external force is applied to the image display apparatus 200, it is possible to reduce the degree of deformation of the light guide plates 220L and 220R and the connection plate 300, easily secure the convergence angles, and reduce the possibility of damage of the image display apparatus 200.

Further, the gaps 55 and 57 are arranged between the rotation restricting units 50L and 50R and the light guide plates 220L and 220R and the connection plate 300; therefore, a force is less likely to be transmitted from the frame 100 to the light guide plates 220L and 220R and the connection plate 300. With this configuration, when the temple part 100b of the frame 100 is stretched, it is possible to reduce the degree of deformation of the light guide plates 220L and 220R and the connection plate 300, easily secure the convergence angles, and reduce the possibility of damage of the image display apparatus 200.

(4.2. Second Modification)

Figure 16:
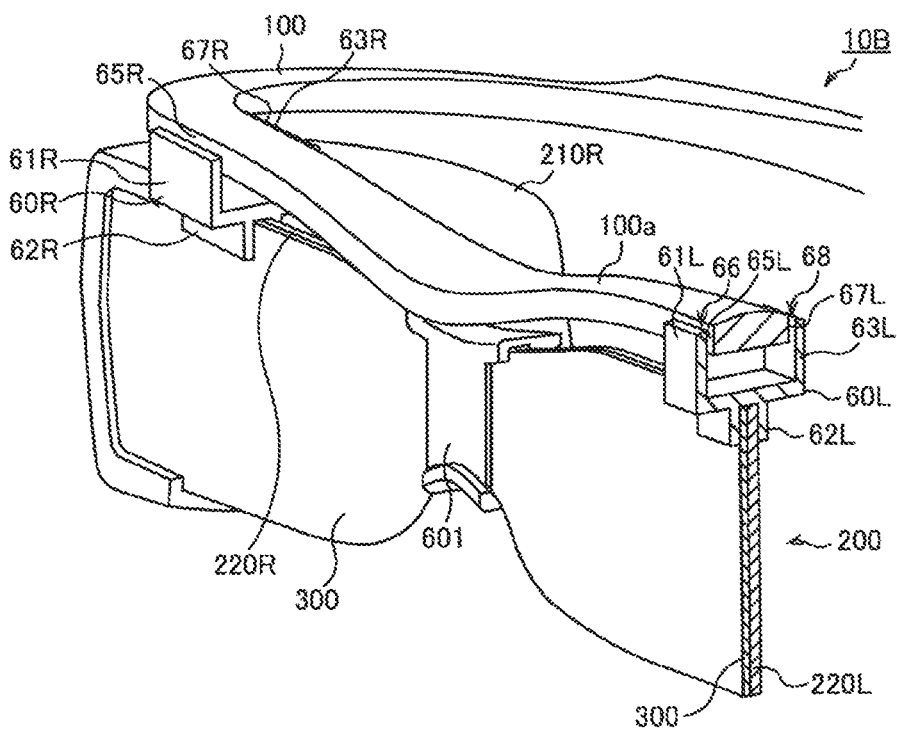
FIG. 16 is a front perspective view of a head-mounted display according to a second modification.

FIG. 16 is a diagram for explaining a head-mounted display 10B according to a second modification. FIG. 16 is a perspective view including cross-sections of an extended part 60L, the light guide plate 220L, and the connection plate 300 of the head-mounted display 10B according to the second modification. In the head-mounted display 10B according to the second modification, the image display apparatus 200 includes the image forming apparatus 210R (the image forming apparatus 210L is not illustrated), the light guide plates 220L and 220R and the connection plate 300 as the optical member, and the extended parts 60L and 60R that extend from the light guide plates 220L and 220R and the connection plate 300 that are bonded together. In the head-mounted display 10B according to the second modification, parts of the frame 100 function as the rotation restricting units that are arranged opposite to the light guide plates 220L and 220R and the connection plate 300 across predetermined gaps 66 and 68.

Specifically, in the head-mounted display 10B according to the second modification, a reinforcing member 601 is constructed with only a part that is attached to the top side surface of the central part of the connection plate 300, and does not include reinforcing parts that extend leftward and rightward from the central part. The extended part 60L is mounted on the upper end portions of the left light guide plate 220L and the connection plate 300, and the extended part 60R is mounted on the upper end portions of the right light guide plate 220R and the connection plate 300. The extended parts 60L and 60R respectively include bonding portions 62L and 62R that are bonded while sandwiching the light guide plates 220L and 220R and the connection plate 300, the front ribs 61L and 61R that are located on a front side of the front part 100a of the frame 100, and rear ribs 63L and 63R that are located on a rear side of the front part 100a.

The front ribs 61L and 61R are arranged opposite to top side surfaces 65L and 65R of the front part 100a across the gap 66. In this case, the top side surfaces 65L and 65R of the front part 100a are arranged on the user's face side relative to the front ribs 61L and 61R. The rear ribs 63L and 63R are arranged opposite to back side surfaces 67L and 67R of the front part 100a across the gap 68. In this case, the back side surfaces 67L and 67R of the front part 100a are arranged opposite to the user's face side relative to the rear ribs 63L and 63R.

Similarly to the first modification, a width of each of the gaps 66 and 68 may be set to be larger than the width t that is set in accordance with the design condition represented by Equation (1) in the above-described embodiment. With the gaps 66 and 68 as described above, when the temple part 100b of the frame 100 is stretched, it is possible to reduce the degree of deformation of the light guide plates 220L and 220R and the connection plate 300.

Meanwhile, the extended parts 60L and 60R illustrated in FIG. 16 are arranged at position on left and right sides separated from the central part of the frame 100, but the positions and the ranges in which the extended parts 60L and 60R are arranged may be set appropriately.

In the head-mounted display 10B according to the second modification, the extended parts 60L and 60R that are bonded to the light guide plates 220L and 220R and the connection plate 300 are arranged opposite to the top side surfaces 65L and 65R or the back side surfaces 67L and 67R of the front part 100a of the frame 100 across the gaps 66 and 68. With this configuration, the movement range of the relative rotation of the light guide plates 220L and 220R and the connection plate 300 with respect to the frame 100 is restricted. Therefore, even when an external force is applied to the image display apparatus 200, it is possible to reduce the degree of deformation of the light guide plates 220L and 220R and the connection plate 300, easily secure the convergence angles, and reduce the probability of damage of the image display apparatus 200.

Further, the gaps 66 and 68 are arranged between the extended parts 60L and 60R and the light guide plates 220L and 220R and the connection plate 300; therefore, a force is less likely to be transmitted from the frame 100 to the light guide plates 220L and 220R and the connection plate 300. With this configuration, when the temple part 100b of the frame 100 is stretched, it is possible to reduce the degree of deformation of the light guide plates 220L and 220R and the connection plate 300, easily secure the convergence angles, and reduce the probability of damage of the image display apparatus 200.

(4.3. Third Modification)

In the head-mounted displays according to the embodiment and the modifications as described above, the image display apparatus 200 includes the two left and right image forming apparatuses 210L and 210R, and the optical member that is connected to each of the image forming apparatuses 210L and 210R and arranged on the central side in the left-right direction of the user's face relative to the image forming apparatuses 210L and 210R; however, the image forming apparatus may be arranged on, for example, an upper part of the frame.

Figure 17:
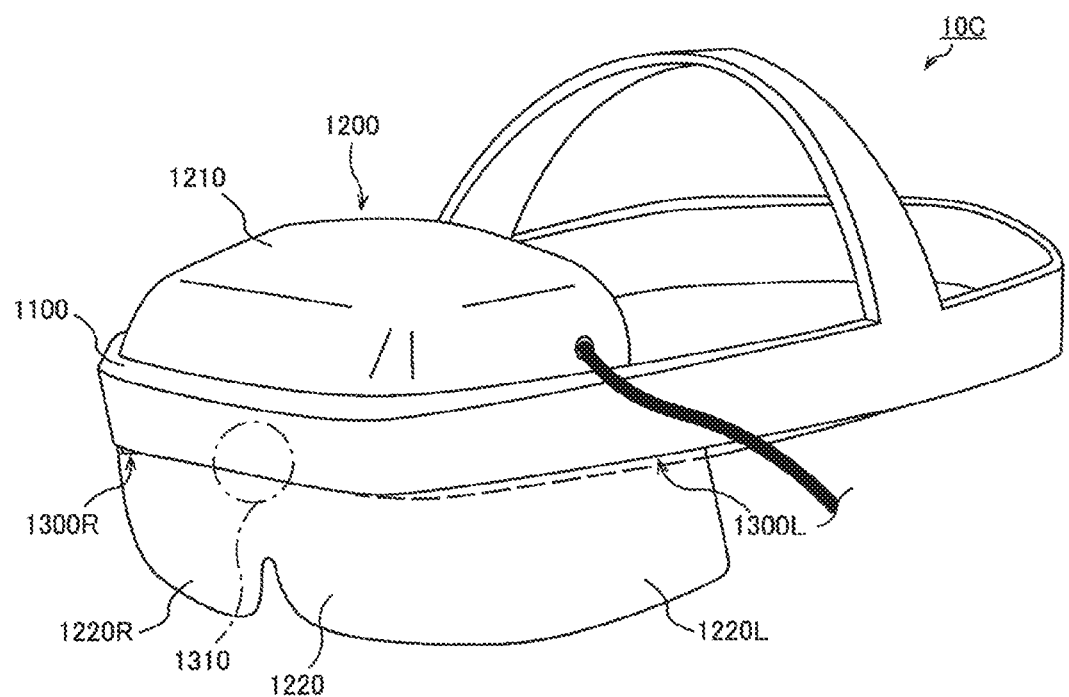
FIG. 17 is a front perspective view of a head-mounted display according to a third modification.

FIG. 17 is a perspective view of a head-mounted display 10C in which an image forming apparatus 1210 is arranged on an upper part of a frame 1100 according to a third modification. The head-mounted display 10C according to the third modification includes the image forming apparatus 1210 and an optical member 1220 that is connected to the image forming apparatus 1210 and arranged in front of left and right eyes of the user. The image forming apparatus 1210 is mounted on the upper part of the frame 100 and generates virtual images for the left and right eyes. Further, for example, the optical member 1220 includes a light guide plate and a polarizing plate, guides light emitted from the image forming apparatus 1210, and outputs light towards the eyes of the user.

In the head-mounted display 10C, the optical member 1220 is connected to the frame 1100 at a central part 1310 in the left-right direction, for example. Further, upper end portions of left and right parts 1220L and 1220R of the optical member 1220 are arranged inside groove portions 1300L and 1300R that are arranged in the frame 1100. In the groove portions 1300L and 1300R, top side surfaces of the upper end portions of the left and right parts 1220L and 1220R of the optical member 1220 are arranged opposite to side surfaces facing the user's face among side surfaces of the groove portions 1300L and 1300R across predetermined gaps. Further, back side surfaces of the upper end portions of the left and right parts 1220L and 1220R of the optical member 1220 are arranged opposite to side surfaces that are opposite to the user's face among side surfaces of the groove portions 1300L and 1300R across predetermined gaps.

Even in the head-mounted display 10C according to the third modification, when an external force is applied to the optical member 1220, it is possible to reduce the degree of deformation of the optical member 1220, easily secure the convergence angles, and reduce the possibility of damage of the optical member 1220. Further, the gaps are arranged between each of the groove portions 1300L and 1300R of the frame 1100 and the optical member 1220, so that a force is less likely to be transmitted from the frame 1100 to the optical member 1220. Even in a state in which an external force is not applied to the optical member 1220, it is possible to reduce the degree of deformation of the optical member 1220, easily secure the convergence angles, and reduce the possibility of damage of the optical member 1220.

The preferred embodiment of the present disclosure has been described above with reference to the accompanying drawings, whilst the present technique is not limited to above examples. A person skilled in the art may conceive various alternations and modifications within the scope of the appended claims, and it should be understood that they will naturally come under the technical scope of the present disclosure.

For example, in the head-mounted display according to the embodiment as described above, the joint member is bonded on the back side surface of the central part of the connection plate and the reinforcing member is bonded on the top side surface, but the techniques of the present disclosure are not limited to this example. In a configuration in which the joint member and the reinforcing member are integrated such that the joint member supports the two optical modules on the left and right sides and the central part of the joint member is connected to the frame, the joint member may be configured in the same manner as the reinforcing member of the embodiment as described above. For example, the light guide plates and the connection plate may be arranged inside the groove portion of the joint member.

Furthermore, in the head-mounted display according to the embodiment, the connection plate 300 joins the two optical modules 200L and 200R on the left and right sides, and the connection plate 300 and the reinforcing member 600 are bonded to only a surface of the central part opposite to the user's face in the connection plate 300; however, the techniques of the present disclosure are not limited to this example. For example, the two left and right optical modules 200L and 200R may be directly joined to and supported by the reinforcing member 600 without using the connection plate. In this case, the reinforcing member 600 has both of a function to support the two left and right optical modules 200L and 200R and a function to improve rigidity of the light guide plates 220L and 220R.

Moreover, the head-mounted display according to the embodiment includes the optical module including the first polarizing unit and the second polarizing unit that are formed on portions cut out from the light guide plate; however, the techniques of the present disclosure are not limited to this example. The head-mounted display may include the optical module in which the first polarizing unit and the second polarizing unit constructed with, for example, reflective volume hologram diffractive gratings are arranged on a top surface of the light guide plate.

Furthermore, in the head-mounted display according to the embodiment as described above, both of the light guide plate and the connection plate that constitute the optical member are disposed inside the groove portion of the reinforcing member, and each of the light guide plate and the connection plate is arranged opposite to the rotation restricting unit; however, the techniques of the present disclosure are not limited to this example. For example, only one of the light guide plate and the connection plate may be protruded so as not to overlap with the other one of the light guide plate and the connection plate and may be arranged inside the groove portion of the reinforcing member.

Moreover, in the head-mounted display according to the embodiment as described above, the optical member arranged in front of the left and right eyes of the user include the light guide plates 220L and 220R, the polarizing plate, and the connection plate 300; however, the techniques of the present disclosure are not limited to this example. The optical member of the head-mounted display may be configured to include an optical reflective plate, an optical transmission plate, or a lens. In other words, the head-mounted display may be a device of any of a transmission type, a non-transmission type, a virtual image projection type, and a retina projection type. In addition, the head-mounted display may be a device including a virtual reality (VR) function, or a device including an augmented reality (AR) function. In the head-mounted display including any of the optical members, it is possible to reduce a change of the convergence angles and damage of the optical member due to deformation of the optical member when an external force is applied to the image display apparatus.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A head-mounted display comprising:

a frame worn on a head of an observer;

an image display apparatus that is connected to a central part of the frame in a left-right direction and that includes an image forming apparatus; and an optical member that is connected to the image forming apparatus and arranged in front of left and right eyes of the observer; and a rotation restricting unit that is arranged opposite to, across a predetermined gap in a front-rear direction, one of the optical member and an extended part that extends from the optical member.

(2)

The head-mounted display according to (1), wherein the rotation restricting unit is arranged opposite to a face of the observer relative to at least one of the optical member and the extended part.

(3)

The head-mounted display according to (1) or (3), wherein the image display apparatus includes a reinforcing member that is joined to the central part of the optical member, and the rotation restricting unit is a part of the reinforcing member.

(4)

The head-mounted display according to (3), wherein a part of the optical member is disposed inside a groove portion that is formed in the reinforcing member, and the rotation restricting unit is a side surface of the groove portion.

(5)

The head-mounted display according to (1) or (2), wherein the rotation restricting unit is a part of the frame.

(6)

The head-mounted display according to (5), wherein the rotation restricting unit is a rib formed on the frame.

(7)

The head-mounted display according to any one of (1) to (6), wherein when the optical member rotates about the central part, the rotation restricting unit and one of the optical member and the extended part arranged opposite to each other come into contact with each other.

(8)

The head-mounted display according to any one of (1) to (7), further comprising:

an up-down movement restricting unit that restricts a relative movement range of the rotation restricting unit and one of the optical member and the extended part in a vertical direction, in cooperation with at least one of a left side and a right side sandwiching a central part of the image display apparatus in a left-right direction.

(9)

The head-mounted display according to (8), wherein the image display apparatus includes a reinforcing member that is joined to the central part of the optical member, a part of the optical member is disposed inside a groove portion that is formed in the reinforcing member, the rotation restricting unit is a side surface of the groove portion, and the up-down movement restricting unit includes an engaging groove that is formed on one of the reinforcing member and the image forming apparatus, and an engaging protrusion that is formed on the other one of the reinforcing member and the image forming apparatus.

(10)

The head-mounted display according to any one of (1) to (10), wherein the optical member includes two left and right optical plates; and a connection plate that connects the two left and right optical plates.

(11)

The head-mounted display according to any one of (1) to (10), wherein the optical member includes a light guide plate.

(12)

The head-mounted display according to any one of (1) to (10), wherein the optical member includes an optical reflection plate.

(13)

The head-mounted display according to any one of (1) to (10), wherein the optical member includes an optical transmission plate.

(14)

The head-mounted display according to any one of (1) to (10), wherein the optical member includes a lens.

REFERENCE SIGNS LIST

10 Head-mounted display
11, 13 Side surface (rotation restricting unit)
21, 23 Gap
30 Up-down movement restricting unit
31 Engaging groove
41 Engaging protrusion
50L, 50R Rotation restricting unit
51L, 51R Front rib
53L, 53R Rear rib
60L, 60R Extended part
65L, 65R Top side surface (rotation restricting unit)
67L, 67R Back side surface (rotation restricting unit)
100 Frame
100a Front part
200 Image display apparatus
200L, 200R Optical module
210L, 210R Image forming apparatus
220L, 220R Light guide plate
300 Connection plate
400 Joint member
600 Reinforcing member
610L, 610R Reinforcing part
630L, 630R Groove portion

The invention claimed is:

1. A head-mounted display, comprising:
a frame worn on a head of an observer;
an image display apparatus that is connected to a central part of the frame in a left-right direction and that includes
an image forming apparatus;
an optical member that is connected to the image forming apparatus and arranged in front of left and right eyes of the observer; and
a reinforcing member that includes restriction ribs,
wherein parts of the restriction ribs are inside restriction grooves in a lower surface of the frame; and
a rotation restricting unit that is arranged opposite to, across a specific gap in a front-rear direction, one of the optical member and an extended part that extends from the optical member.

2. The head-mounted display according to claim 1, wherein the rotation restricting unit is arranged opposite to a face of the observer relative to at least one of the optical member and the extended part.

3. The head-mounted display according to claim 1, wherein
the reinforcing member is joined to the central part of the optical member, and
the rotation restricting unit is a part of the reinforcing member.

4. The head-mounted display according to claim 3, wherein
a part of the optical member is disposed inside a groove portion that is in the reinforcing member, and
the rotation restricting unit is a side surface of the groove portion.

5. The head-mounted display according to claim 1, wherein the rotation restricting unit is a part of the frame.

6. The head-mounted display according to claim 5, wherein the rotation restricting unit is a rib on the frame.

7. The head-mounted display according to claim 1, wherein when the optical member rotates about the central part, the rotation restricting unit and one of the optical member or the extended part arranged opposite to each other come into contact with each other.

8. The head-mounted display according to claim 1, further comprising:
an up-down movement restricting unit that restricts a relative movement range of the rotation restricting unit and one of the optical member or the extended part in a vertical direction, in cooperation with at least one of a left side and a right side sandwiching a central part of the image display apparatus in a left-right direction.

9. The head-mounted display according to claim 8, wherein
the image display apparatus includes the reinforcing member that is joined to the central part of the optical member,
a part of the optical member is disposed inside a groove portion that is in the reinforcing member, the rotation restricting unit is a side surface of the groove portion, and the up-down movement restricting unit includes an engaging groove that is on one of the reinforcing member or the image forming apparatus, and an engaging protrusion that is on end portion of the reinforcing member of the image forming apparatus.

10. The head-mounted display according to claim 1, wherein the optical member includes two left and right optical plates; and a connection plate that connects the two left and right optical plates.

11. The head-mounted display according to claim 1, wherein the optical member includes a light guide plate.

12. The head-mounted display according to claim 1, wherein the optical member includes an optical reflection plate.

13. The head-mounted display according to claim 1, wherein the optical member includes an optical transmission plate.

14. The head-mounted display according to claim 1, wherein the optical member includes a lens.

\* \* \* \* \*